Jan. 14, 1964 D. GABOR 3,118,107
THERMOELECTRIC GENERATOR
Filed June 21, 1960 2 Sheets-Sheet 1
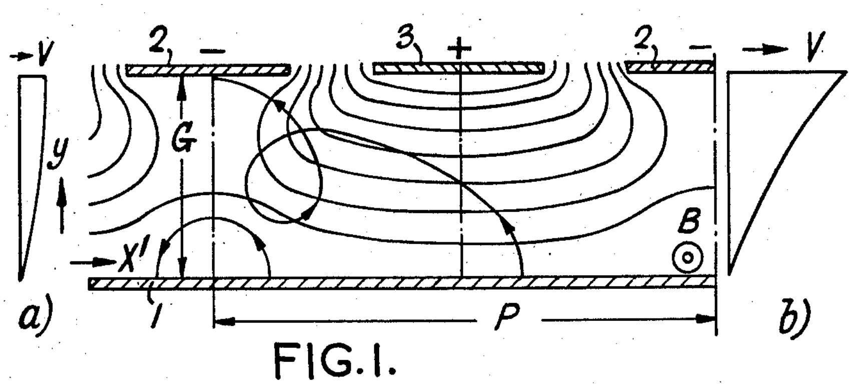
FIG.1.
FIG.2.
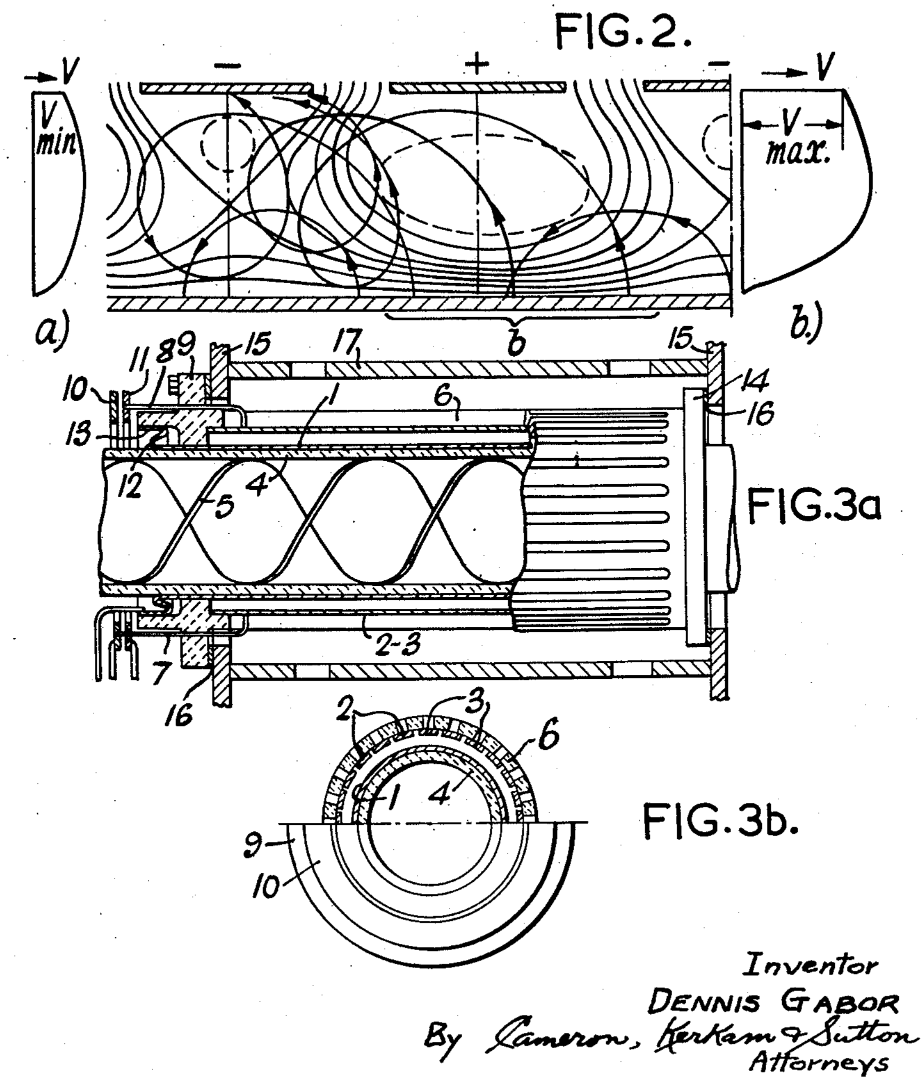
FIG.2. FIG.3a FIG.3b.
Inventor
DENNIS GABOR
By Cameron, Kerkam & Sutton
Attorneys Inventor
DENNIS GABOR
By Cameron, Kerkam & Sutton
Attorneys 3,118,107
THERMOELECTRIC GENERATOR
Dennis Gabor, London, England, assignor to National Research Development Corporation, London, England, a British corporation
Filed June 21, 1960, Ser. No. 37,726
Claims priority, application Great Britain June 24, 1959
12 Claims. (Cl. 322—2)

This invention relates to thermoelectric generators, that is to say devices which convert heat energy into electric power. More particularly it relates to generators of the vacuum or gas discharge type, as distinct from solid-state thermoelements.

The efficiency of vacuum or gas-discharge thermoelectric generators is mainly limited by the smallness of the current densities which can be maintained in them, and these in turn are limited by the smallness of the voltages available for driving the currents through the space between the electron emitter and collector. As an example consider a generator operating with an emitter temperature of 1800° K. (1527° C.) and a collector temperature of 373° K. (100° C.). Assuming for the emitter the very low emission coefficient of 0.05 the radiation loss alone is about 3 watt/cm.$^2$ area. Assume for the hot emitter a work function of 3 electron volts, and for the cold collector 1 e.v. With zero potential difference between them in the vacuum this would leave a useful voltage at the terminals of $3-1=2$ volts. It is therefore evident that unless the current density is rather high, of the order of one amp./cm.$^2$, the efficiency will be very low. An emitter of 3 e.v. work function at 1800° K. is capable of emitting a current density of this order, but to get a current of 1 amp./cm.$^2$ across a gap, even in a caesium arc, one requires a voltage drop of the order 1.7 volts, which leaves only 0.3 volt available at the terminals, giving an output of 0.3 watt/cm.$^2$, while the radiation loss alone is 3 watt/cm.$^2$. It is therefore evident that any increase in the voltage drop available in the gas-discharge gap of the generator will greatly improve the efficiency beyond the modest values so far achieved. This, however, cannot be achieved by raising the work function of the emitter, because this would decrease the emission density, nor can it be obtained by lowering the work function of the collector, because no materials are known with a work function much lower than 1 e.v.

According to the present invention a thermionic electric generator is provided comprising a heating source, a cathode exposed to said heating source, a plurality of sets of anodes arranged in a surface facing said cathode with the anodes of each set interspersed with the anodes of another set, means enclosing the space between said cathode and said anodes, a low pressure gas or vapour filling the enclosed space and means for setting up a magnetic field extending in a direction transverse to the cathode/anode path. The cathode may be tubular and heated from within and an anode structure comprising at least two sets of anodes surrounding the cathode is then provided, the anodes of one set alternating between the anodes of the other set, means being provided for cooling the anodes. The magnetic field then extends in directions parallel to the axis of the cathode structure.

According to a feature of the invention the generator is connected to a transformer, the anodes of one set being connected to one end of the primary winding, the anodes of the other set to the other end of the primary winding and the cathode to a tapping on the primary winding. The secondary of the transformer may then be connected in a tuned circuit. With such an arrangement conditions can be found, to be specified later, in which a strong current is emitted by the cathode under the influence of the set of anode-strips which have instantaneously a relatively high voltage, of 4–6 volts, or even more, yet by the influence of the magnetic field the said current is diverted from the anodes at high voltage and collected by the other set of anodes whose voltage is only 0.5–1.5 volts above the cathode. Thereby it is possible to operate such a device, under otherwise identical conditions, with higher power-densities per unit area than a D.C. diode. Though the efficiency of the magnetron operation in terms of conversion of the power of electron flow into oscillatory energy may not be more than 50–75%, this loss is more than outweighed by the factor by which the power is increased, and thereby also the total efficiency in the face of power-independent losses such as radiation and heat conduction.

As a further advantage of the invention, while loaded thermoelectric diodes give D.C. terminal voltages of 0.5–2 volt, which makes it necessary to connect a large number in series to obtain convenient voltages of the order of 24–100 v., the radio-frequency power supplied by the new device makes it possible to transform this to the desired voltage, and then to rectify it into smoothed direct current, using only one unit.

It is a further advantage of the device according to the invention that it can be made in larger units than D.C. diodes, not being subject to the same limitation by the magnetic field set up by the output current as the devices hitherto proposed.

The invention will be better understood with reference to the accompanying drawings wherein:

FIG. 1 is a diagram illustrating the electric fields in a device according to the invention in the absence of strong currents and ionization.

FIG. 2 illustrates the electric fields distorted by space charges in the presence of strong currents and ionization, and a few electron trajectories.

FIG. 3*a* is a longitudinal sectional view of a thermoelectric generator according to the invention, and FIG. 3*b* is a view, partially in transverse section, thereof.

Figure 4:
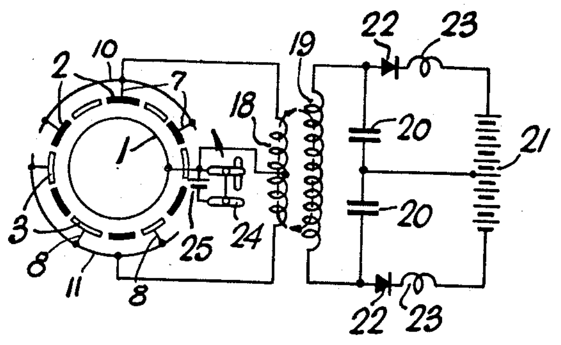

FIG. 4 is a diagram of one circuit for the operation of the thermoelectric generator.

Figure 5:
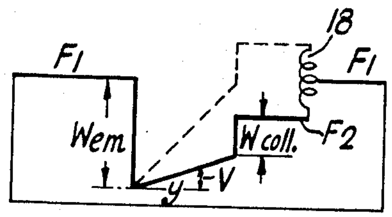

FIG. 5 is a diagram illustrating the operation of the generator in the circuit as shown in FIG. 4.

Figures 6, 7:
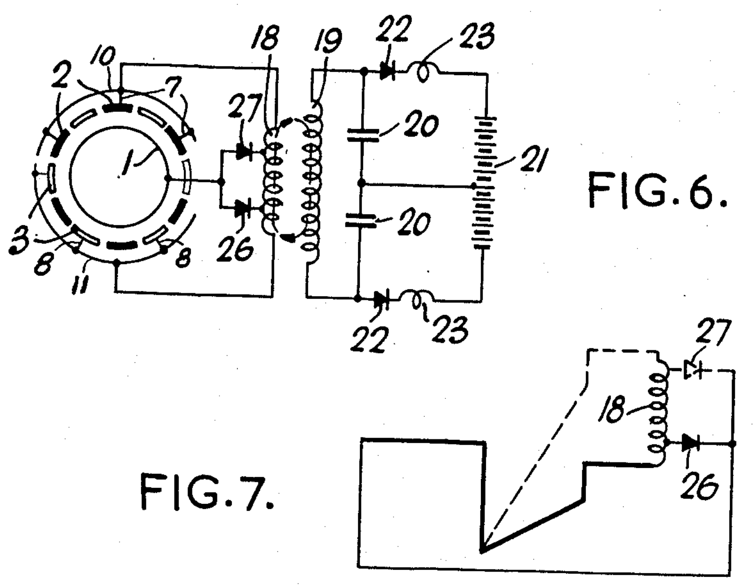

FIG. 6 is a diagram of an alternative circuit.

FIG. 7 is a diagram illustrating the operation of the generator in the circuit as shown in FIG. 6.

FIG. 1 is a section through a small part of the thermoelectric generator of the present invention, at right angles to the magnetic field B, which points outwards from the plane of the drawing. 1 is the hot cathode, here shown plane instead of cylindrically curved, for simplicity of explanation. 2 and 3 are representatives of the two sets of alternating anode-strips. An alternating voltage of frequency $f$ is applied between the two sets of anode-strips, causing an alternating electric field of frequency $f$ to be developed in the inter-electrode space. The electric field is illustrated at the instant when the anodes 2 are at their minimum potential, equal to one unit, and the anodes 3 at their maximum, equal to 4 units. That is to say that the anodes oscillate around a mean value of 2.5 units, with a peak amplitude of 1.5 units. The sets of anodes 2 and 3 are symmetrical and the following description applies in similar fashion to each half of the operating cycle. The equipotential lines are shown in steps of one-half unit. The diagram (*a*) at the left illustrates the potential profile V($y$), that is to say the potential with respect to the cathode as a function of the distance $y$ therefrom in the mid-plane of 2, the diagram (*b*) similarly in the mid-plane of 3. This representation is valid in the absence of space charges, that is to say in the case of very small currents only.

FIG. 1 also shows two characteristic electron trajectories. These are to be understood as being drawn in a coordinate system $x'$, $y$ which moves to the left with a velocity $u=Pf$, P being the length of a period, that is to say the distance between two corresponding anodes, 2—2, or 3—3, and $f$ is the frequency of the alternating field. It is known that an alternating field can be analyzed into two travelling fields, one moving to the left, the other to the right, both with velocity $u$. Representation of the trajectories in the frame moving in the same direction as the electrons are drifting, that is to say in the present case to the left, has the advantage that the electron trajectories appear very nearly stationary in it, as the field component travelling opposite to them has only a small effect. It is seen that the electron trajectories have a tendency to land on the instantaneously more negative of the anodes. It is also seen that those trajectories which land on the said electrode originate at that part of the cathode which is opposite to a more positive anode, while those which originate opposite the less positive anode are returned to the cathode.

By this fact the arrangement as shown in FIG. 1 has an advantage over thermoelectric D.C. diodes, as known in the art, but only a small one, because the currents, though larger than in a D.C. diode, are still too small for good efficiency. A serious advantage is achieved only by combining the magnetron principle, with the use of an easily ionizable gas or vapour filling, with preference the vapours of the heavier alkali metals, such as potassium, rubidium, caesium or francium. These metals have ionization potentials between 4.4 and 3.8 volts. Caesium arcs have been operated at voltage drops as low as 1.7 volts, but this made it necessary to use pressures of the order of 15–35 microns of mercury, corresponding to saturation at 160–180° C. As previously mentioned, the voltage available in thermoelectric D.C. diodes is barely sufficient for this rather critical operation. On the other hand with 4–6 volts or more available in the device according to the invention it becomes possible to produce a sufficient number of ions to compensate the space charge and to raise the current densities from the order of a few milliamps./cm.$^2$ to several amps./cm.$^2$ at a vapour pressure so low that only a minority of electrons suffer substantial deviations by collisions with vapour atoms, and which, in the case of caesium vapour can be produced by saturation at or even below the temperature of boiling water. The operation of the device under such conditions is approximately illustrated in FIG. 2.

In this figure, which otherwise corresponds to FIG. 1, it is assumed that sufficient ions have been generated for largely compensating the electron space charges. It is known from the physics of arc-like discharges that positive ions will be produced, or will accumulate where the electron space charge is heaviest, that is to say in the first line close to the cathode, where they will produce a cathode sheath region with a voltage drop sufficient for ionization. Such a sheath with a concentrated field is shown in FIG. 2 all along the cathode, but only in its section opposite to the more positive anode will the voltage drop in said sheath be sufficient for ionization. Apart from ionization by electron collisions a certain number of ions will be formed also by contact of the alkali atoms with the hot cathode. This effect, however, will be strong only in the case of excited alkali atoms, because one-step ionization by contact is possible only if the atom has an ionization potential smaller than the work function of the cathode. As the lowest ionization potential, for caesium, is 3.8 volts, while the work function of a cathode which is to emit currents of the order of one amp./cm.$^2$ at 1500° C. cannot be much more than 3 volts, contact-ionization bcomes effective only if the alkali atoms are pre-excited by electron collisions in the sheath. Moreover, their effect is limited by the fact that contact-ions are practically in thermal equilibrium with the cathode, hence their concentration will fall off with the distance from the cathode by Boltzmann's law. As an example, 1800° K. corresponds to $kT=0.16$ e.v., hence at a distance from the cathode where the potential is 0.5 volt positive to the cathode the concentration of the contact-ions will be about $\frac{1}{20}$ at 1 volt only about $\frac{1}{400}$ of what it is at the cathode surface. It is therefore necessary to supplement them by ions formed in the cathode sheath, consequently the drop in the said sheath will absorb all the voltage drop available. In fact it will absorb even more, because ions are needed also near the anode. The potential profile, as shown in FIGS. 2*a* and *b*, for the minimum-voltage and the maximum-voltage zones respectively, will therefore exceed the total voltage between the cathode and the anodes, so that a part of the ions formed will drift not to the cathode but to the anode. This phenomenon is known as the "negative anode drop" and its exploitation is essential for success because a total drop of 4–6 volts cannot sustain an arc with positive anode drop, not even in the most easily ionizable alkali metal vapours. The negative anode drop is achieved by making the alkali vapour pressure just large enough for producing the required number of ions, but not so large as to slow down or to scatter the electrons unduly. The number of ions required is about $(m/M)^{1/2}$ per electron, where $m$ is the electron mass and M the ion mass. In caesium vapour for instance this is about 1/490, that is to say in the mean one out of 490 electrons must produce an ion in its passage from the cathode to an anode. At electron energies of 5–7 e.v., which assuming a negative anode drop of 1 volt corresponds to 4–6 volts total drop, this number can be produced with not more than a fraction of the order of one-tenth of the electrons suffering collisions at all. This justifies the assumption underlying FIG. 2, that the electron trajectories are modified by the space charge, but not appreciably scattered by collisions.

It is seen that though the electron trajectories appreciably differ in detail from the space-charge free case shown in FIG. 1, the same effect is again achieved, that is to say the electrons land at the instantaneously less positive of the anodes. This means that current is flowing against the alternating component of the voltage, which in turn means that alternating power is generated, and therefore, given suitable outer resonant circuits, the magnetron is capable of oscillations. Moreover, as these resonant circuits, to be described later, contain no external source of D.C. power, the oscillatory power is generated at the expense of the thermal energy flow, carried by the electrons from the hot cathode to the cold anodes.

In order to produce the current flow as illustrated in FIG. 2 it is necessary that the electrons shall not suffer more collisions than required for ionization. Taking caesium vapour as an example, the total cross-section of a caesium atom for 4–5 e.v. electrons is about $3\times10^{-14}$ cm.$^2$. Assume that the trochoidal electron trajectories between cathode and anode have a mean length of about 1 cm. If it is required that only about $\frac{1}{10}$ of these electrons shall suffer a collision, the density of caesium ions must be about $3.3\times10^{12}$/cm.$^3$. This corresponds, in round figures, to a pressure of 0.1 micron of mercury at room temperature. But as the temperature of the caesium vapour in the discharge space will be about 1000° K., by the heating of the cathode alone, and somewhat more by the heat developed in the discharge itself, the pressure required will be about 0.3–0.5 micron. This corresponds to saturation at about 60° C., hence the coldest spot in the envelope at which caesium will condense must be kept approximately at this temperature. If the mean trajectory length is reduced from 1 cm. to 0.25 cm., the pressure should be about 2 microns, which corresponds to the temperature of boiling water. If these conditions are satisfied 90% of the electrons will move undisturbed. Of the remaining 10% which suffer collisions it is sufficient if one in about 50 produces an ion. It may be noted that the ions move about 500 times slower than the electrons, hence the configuration of the ion cloud will remain substantially unchanged during a half-cycle of the oscillation, when the field configuration as shown in FIG. 2*a* changes into that shown in FIG. 2*b* or vice versa. This change therefore is almost entirely due to the motion of the electron cloud, which in FIG. 2*a* neutralizes the ion cloud to a greater extent than in FIG. 2*b*.

In addition to the right pressure, other design parameters of the device must be kept within certain limits in order to ensure correct operation of the device. These parameters are:

The anode pair period P and the gap G, measured in cms.

The magnetic field intensity B, measured in gauss.

The smallest and the largest voltage drops, $V_{min}$ and $V_{max}$, in volts.

The frequency $f$ or the radian frequency $\omega=2\pi f$ in cycles/sec.

With the usual symbols $e$ for the charge, $m$ for the mass, $v$ for the velocity of an electron, $c$ for the velocity of light, and $\omega_c=eB/mc$ for the electron gyro- or cyclotron-frequency the design rules can be stated as follows:

(1) Electrons which start opposite the more positive anode at a voltage $V_{max}$ must miss this anode. As the voltage $V_{max}$ is substantially concentrated in a thin drop-region before the cathode while the rest of the space is substantially field-free, the electrons will move nearly on a circle of radius R, which starts at right angles to the cathode, hence R must be less than G. Using the well known formula for the radius R and the energy theorem, this gives $$R^2=(mvc/eB)^2=v^2/\omega_c^2=2eV_{max}/m\omega_c^2\leqq G^2 \quad (1)$$

(2) Electrons, starting at the cathode with initial energies however small, must not be prevented from reaching the less positive anode, at voltage $V_{min}$ by the energy theorem obtaining in the frame moving with the velocity $u=Pf=P\omega/2\pi$ in the direction of the electron drift. This theorem, first found by D. R. Hartree, states that for electrons starting at the cathode with initial velocity $v_0'$ and arriving at the anode with velocity $v'$, both $v'$ and $v_0'$ being measured in the said moving frame $$\tfrac{1}{2}m(v'^2-v_0'^2)=eV_{min}-m\omega_c uG$$

Hence an electron with zero initial velocity $v_0'$ can arrive at the anode at $V_{min}$ only if $$eV_{min}\geqq m\omega_c uG=\frac{m}{2\pi}\omega_c PG \quad (2)$$

It may be noted that this is a necessary condition to be obeyed by electrons landing at the anode at $V_{min}$, but by itself is not a sufficient condition. However, detailed ray tracings confirm that, if the conditions 1 and 2 are interpreted as near-equalities, then they are in fact not only necessary but also sufficient. For instance in the example shown in FIG. 2 the electrons starting from the base *b*, somewhat wider than half a period P, are all collected at $V_{min}$.

Combining Equations 1 and 2 gives the important design rule $$V_{max}/V_{min}\leqq(\omega_c/\omega)(G/P) \quad (3)$$

Ray tracing shows that $G/P=0.25$—$0.5$ gives favourable conditions. In FIGS. 1 and 2 $G/P=0.4$. Assuming $G/P=1/\pi$ as a rough mean value, it is seen that in this case $V_{max}/V_{min}\leqq\omega_c/\omega$. As previously explained, $V_{min}$ cannot well be made more than 1–1.5 volts, hence in order to realize $V_{max}=4$–$6$ volts the operating frequency must not be more than ¼ of the cyclotron frequency.

Having decided on a suitable value of $\omega/\omega_c$, for instance 0.2, the remaining data can be obtained from Equation 2, which can be written in the practical form $$PGB^2\leqq 35V_{min}(\omega_c/\omega) \text{ gauss}^2 \text{ cm.}^2 \quad (4)$$

For instance let $V_{min}=1$ volt, $\omega/\omega_c=0.2$, $P=1$ cm., $G=0.316$ cm., this gives $B^2\leqq 550$ and $B\leqq 23.4$ gauss. Let $B=20$ gauss. This gives $\omega_c=1.78\times10^7B=3.58\times10^8$ cycles, $\omega=0.2\omega_c=7.16\times10^7$ cycles and a frequency $f=1.15\times10^7$ cycles or 11.4 megacycles.

These rules, interpreted as expressing near-equalities, ensure also a good conversion efficiency. The maximum amount of radio-frequency energy which an electron can generate in its passage from the cathode to the collector at a potential $V_{coll}$ is $e.V_{coll}$. This will be the case if the electron is collected with the same kinetic energy with which it left the cathode, because in this case, instead of being accelerated by the field and converting its kinetic energy into heat at the collector, the electron has passed on this energy completely to the A.C. field. The efficiency is best at the instant when $V_{coll}$ is smallest, equal to $V_{min}$, because if at this instant the inequality 2 becomes an equality by Hartree's theorem $v'^2=v_0'^2$. This, however, does not mean 100% conversion efficiency, because Hartree's theorem relates to the apparent kinetic energies in the moving frame, not to the absolute kinetic energies. Taking into account that the absolute velocity in the x-direction, $dx/dt$, is connected with the velocity in the moving frame, $dx'/dt$, by the relation $dx/dt=dx'/dt-u$ one obtains for the conversion efficiency $$\eta=1-muv_0'(\cos\theta_0)/eV_{min} \quad (5)$$

where $\theta_0$ and $\theta$ are the angles of the trajectory with the x-direction, at departure and at arrival respectively. For electrons which have a small absolute initial velocity the initial velocity $v_0'$ in the moving system will be approximately $u$. The largest value of the bracket-expression in Equation 5 is 2. One thus obtains, making use of Equation 2 and Equation 3

$$\eta\geqq 1-2mu^2/eV_{min}=1-2u/\omega_c G=1-V_{min}/V_{max} \quad (6)$$

This shows that at any rate at the instant when the collector potential is lowest the conversion efficiency can be made very good, at least 75%. This will be somewhat less when the potential rises, and it will be reduced also by scattering of electrons to the more positive collector, but not very significantly. Even a conversion efficiency of only 50% is very satisfactory. The overriding consideration in the design of thermoelectric generators of the gas discharge type is the power density, and if this can be increased by a factor of 5–10 the loss by non-ideal conversion into A.C. power is of small importance. As an example compare a device according to the invention operating with $V_{min}=1$ volt with a D.C. diode as mentioned in the introduction which operates with a total available voltage of 2 volts, of which only 0.3 volt remain available in the outer circuit after allowing for 1.7 volt drop in the caesium arc. At equal current density the power in the first is about 3 times larger than in the second, and for instance at a current density of 1 amp./cm.$^2$ in both the output, with 50% efficiency, is 0.5 watt/cm.$^2$ in the first, 0.3 watt/cm$^2$ in the second. But with a current density in the first device of 5 amp./cm$^2$, which can be realized by exploiting the magnetron-principle, the useful output increases to 2.5 watt/cm.$^2$, which approaches the order of the power-independent losses by radiation etc. and enables a greatly improved overall efficiency to be achieved.

Having now stated the principles of design FIGS. 3*a* and *b* illustrate one form of the device. A tubular cathode 1 is heated by flame gases through a ceramic tube 4, which prevents the metal tube from corrosion. A helical guide 5, preferably also of ceramic material, lengthens the path along which the flame gases make contact with the tube 4. As an example, let the cathode temperature be 1500° C. Allowing for the temperature drop in the tube 4 the flame gases then ought to have a temperature of about 1600° C. all along the tube. As is well known in the art of heat engineering, this is best achieved by preheating the constituents, air and fuel, as nearly as possible to 1600° C., and letting the combustion take place all along the tube, so that the heat is conducted away at the same rate as it is developed, at constant temperature. No attempt is made in FIG. 3 to show the design of the combustion chamber inside the tube 4, which is required to achieve even mixing and combustion, or the recuperators for the pre-heating of the flame constituents, as these are well known in the art.

While the cathode must be made as hot as possible, the anodes must be well cooled, preferably by direct contact with the coolant, which may be air, oil or water. In the present design this is ensured by a cylindrical outer body 6, preferably of ceramic material. As most ceramic materials are strongly attacked by alkali vapours, the inside of the ceramic body is preferably glazed with an alkali-resisting glass. This body has as many slots parallel to the axis as there are anode strips. These strips 2, 3 are cemented or brazed to the inner surface of 6. In order to facilitate pressing these to the inner surface of 6 during the cementing or brazing operation, this surface can be made slightly conical instead of cylindrical, in which case the cathode must also have a slightly conical shape. The leads 7, 8 of the anode strips, 2, 3 are led through the said slots and through the front flange 9 of the ceramic body, and are connected with two metal rings 10 and 11 respectively. The cathode tube 1 is fitted at both ends with corrugated end pieces 12, made as thin as possible to reduce heat conduction and to avoid putting undue strain on the joint 13 at which the cathode body joins the outer body, and which is preferably a brazed joint. The space between the cathode and the outer body is evacuated, and contains a small quantity of an alkali metal such as caesium, or a mixture of several alkali metals. A little mercury may be added to these with advantage. The vapour pressure of free mercury would be too high at the coolant temperatures which can be easily realized, but mercury dissolved in a surplus of alkali metals has a strongly reduced vapour pressure and the metastable atoms of mercury have a beneficial effect on the ionization of the alkali atoms. The metal will condense on the coolest part of the surface, that is to say on the coolest end of the anode strips. A layer of caesium is very beneficial for a low work function of these strips, especially if these have a surface layer of oxidized silver or the like. The material of the strips themselves is chiefly determined by the requirement of expansion matching to the ceramic body. The material of the cathode must be chosen in the first line with a view to mechanical strength at elevated temperatures, and resistance to corrosion, less from the point of view of electron emission. As previously explained, the work function must be as high as compatible with good emission at the operating temperature, e.g., about 3 volts at 1500° C., 2.2 volts at 1000° C. The surface must have a high albedo such as can be obtained, e.g., by welding a gauze to the metal surface, and filling the meshes with a suitable emissive mixture, such as thoria, barium oxide or calcium oxide.

The whole device is inserted, with its front flanges 9 and rear flanges 14 between the walls 15—15, preferably of iron or some magnetic alloy, of a box containing the coolant medium, and is made tight by means of gaskets 16. The uniform longiutdinal magnetic field is produced by a tube 17, of some permanent magnetic material, also inserted between the walls of the box, with perforations for the coolant. This box can contain a number of such devices, in which case it may be preferable to use a common magnetic tube for several or all of them. With modern permanent magnetic materials one cm.$^3$ of the permanent magnet is sufficient to magnetize a volume of several thousand cm.$^3$ at the rather small magnetic intensities required.

It is economical to make the unit devices such as shown in FIG. 3*a* rather long, because extra length adds little to the cost, and reduces the end losses by conduction. A limit is set by the magnetic field of the current in the cathode, which produces an azimuthal field, at right angles to the uniform axial field. This extra field is strongest at the end at which the cathode current is introduced, and falls linearly to zero at the other end. The resulting field will thus have a component at right angles to the gaps between the anode strips. In FIGS. 1 and 2 this is the horizontal, *x*-direction. This has the effect that near the gap between two anodes the electrons are accelerated towards the instantaneously more positive anode. The effect is always small so long as the current per anode pair is less than about 25 amperes. Thus with 20 pairs one can allow 500 amps. if the cathode current is led in at one end, as in FIG. 3*a*, and 100 amps. if it is led in at both ends. But with certain ratios of $\omega/\omega_c$ one can allow even larger currents per unit.

In another variety of the device according to the invention the whole envelope is metallic. The anode strips are cemented to the inside of a metallic cylinder by means of a suitable insulating cement, such as alkali-resisting enamel glass. This has sufficient heat conductivity to ensure cooling of the anode strips, and it can be shown that at the frequencies envisaged the rather large capacity of the anodes thereby introduced does not prevent achieving sufficiently large Q-factors.

FIGS. 4–7 illustrate the external resonant circuits to be used with the generator, and their operation. The simplest circuit is shown in FIG. 4. The two systems of anode strips 2, 3 are connected with the two ends of the primary coil 18 of a radio-frequency transformer and the cathode 1 is connected to the centre tap of the said coil. The secondary coil 19 has a greater number of turns, and it has also sufficient leakage to form a high-Q resonant circuit in conjunction with the condensers 20. It is convenient to arrange these on the high voltage side, to improve the Q-factor. The radio-frequency power is converted into D.C. power, preferably by feeding a storage battery 21 through rectifiers 22 and R.F. chokes 23, as well known in the art. The oscillations are started by applying, by a starter switch 24 a positive voltage derived from a low-voltage battery 25 between the anodes and the cathode. This battery is switched off when the oscillations have started.

The starting time is chiefly determined by the heating-up of the cathode, but also by the temperature of the coolest spot in the envelope which determines the vapour pressure of the alkali metal. In order to shorten this starting time, it is expedient to start circulation of the coolant only after the oscillations have started.

FIG. 5 is a diagram, illustrating the operation of the device in the circuit shown in FIG. 4. The trace shown in thick lines is the potential plot across the device at the position of minimum potential. This starts at the left with the Fermi-level on the cathode side, $F_1$. At the cathode surface the electrons surmount, by their thermal energies, a potential barrier equal to the work function $W_{em}$ of the emitter substance. The potential of the collector is higher by $V_{min}$, this is the drop which drives the electrons through the discharge space. In the collector the potential between the surface and the Fermi-level $F_2$ rises by $W_{coll}$, the work function of the collector. The difference $F_1-F_2=W_{em}-W_{coll}-V_{min}$ is the voltage available in the outer circuit, and this is used for producing the D.C. potential in the magnetron, by applying it to the centre tap of the transformer coil 18.

In FIG. 5 it has been assumed as illustration that $W_{em}=3W_{coll}$, and that $V_{min}=W_{coll}$. For simplicity let $W_{coll}=V_{min}=1$ volt and $W_{em}=3$ volts. We have then 1 volt drop in the discharge space, and 1 volt applied to one-half of the transformer coil. This induces an equal voltage in the other half of the coil, so that the peak-to-peak A.C. voltage is 2 volts, and a potential $V_{max}=3$ volts appears at the second set of anodes. The potential plot across the device at the position of maximum potential is indicated in FIG. 5 by a thick, broken line. Thus the operation as shown in this figure corresponds to $$V_{max}/V_{min}=3$$

If the alternating voltage increases, e.g. to 3 volts peak-to-peak, $V_{min}$ drops to 0.5 volt and $V_{max}$ increases to 3.5 volts, thus in this case $V_{max}/V_{min}=7$. The increase will continue only to the point at which $V_{min}$ becomes too low for the anode to collect sufficient current to maintain the oscillation at this level, and/or the anode at $V_{max}$ begins to collect electrons, thus lowering the efficiency.

The circuit in FIG. 4 is very simple, but it has the disadvantage that $V_{max}$ is somewhat low, hence the power densities and thereby also the efficiencies will be on a modest level. One way of remedying this is shown in FIG. 6. The circuit shown here differs from that in FIG. 4 only in that the cathode 1 is not connected to the centre tap of the transformer, but through two clamping rectifiers 26, 27 to two tapping points at both sides of the centre. The operation of this device is explained in FIG. 7, in a diagram similar to the one in FIG. 5. At the instant illustrated the rectifier 26 is in action, and clamps a tapping point ⅙ from the lower end to the cathode. In the figure $V_{min}$ is assumed as 1.5 volts, hence the voltage on the bottom sixth of the transformer coil 18 is 0.5 volt, thus the top end of the said coil is at this instant 2.5 volts above cathode potential, and $V_{max}$ is 4.5 volts, giving again a ratio of $V_{max}/V_{min}=3$, as before, but both potentials are now 50% higher. If now the peak-to-peak oscillation amplitude increases from 3 volts to 6 volts, $V_{min}$ drops by ⅙ of the difference, from 1.5 volts to 1 volt, while $V_{max}$ increases by ⅚ of the difference, from 4.5 volts to 7 volts, giving again a ratio of $V_{max}/V_{min}=7$, as before, but at twice the voltages. Thus this method of operation is much more advantageous from the point of view of higher power densities. It has however the disadvantage that it requires two large-current rectifiers, e.g., of germanium.

A second method of increasing the voltages and thereby improving the power densities and efficiencies of the device is by means of a booster battery. This can be illustrated again by FIG. 4, with the difference that the starting battery 25 is now a booster battery, and remains permanently in operation. Assume for instance that it has a voltage of 2 volts. The mid-point of the transformer coil is now shifted to 2 volts relative to the cathode. If we take again $V_{min}=1$ volt, the peak-to-peak A.C. voltage is 6 volts, and $V_{max}=7$ volts, as in the previous example. In the present case however the booster battery supplies power to the magnetron, while in the previous example the oscillations were entirely produced by the thermal power. Only about 50% of this power can be recovered from the A.C. output after rectification. Nevertheless there may be a large absolute gain, because the power level can be so much raised by the boosting, that the gain in the conversion of thermal energy more than covers the power supplied by the booster battery.

This scheme has the disadvantage that accumulator batteries capable of supplying thousands of amperes of currents are large, heavy and expensive. It is therefore proposed to supply the boosting power by a solid-state thermoelement battery, which operates on that part of the heat of the flame gases which is not used up in the preheating of the combustive constituents, e.g., from 500° C. to 100° C. Though the efficiency of such thermoelements may be rather low, of the order 3–5%, they are well capable of supplying the required large currents at the low potentials required, on energy which would be otherwise mostly wasted.

An application of the invention of particular importance is in the drive of motorcars. Though the thermodynamic efficiency of internal combustion engines may be as much as 25%, a thermoelectric generator with an overall efficiency of 10–12% only may well be equally economical. One reason is that in motorcars the gearing consumes a great ptrt of the power, at any rate at low and moderate speeds. An electric drive on the other hand, with the D.C. motors directly on the wheels allows a conversion of electrical into mechanical energy with an efficiency of at least 80%, combined with the unique advantages of D.C. series motors of developing the greatest torque on starting, and of being capable of recovering some of the energy when used as brakes. The other reason is that no high-grade motor fuel is required in a thermoelectric generator. An added advantage in the case of the present invention is that a part at least of the control and regulation can be effected on the A.C. side, without consuming power.

Another application of the invention is in induction heating by radio-frequency currents, as used in the manufacture of vacuum devices, in the curing of plastics, in the drying of wood, and in many other industrial applications. In this case there is no rectification required, and the radio-frequency energy is directly utilized. Other applications and modifications of the invention will be obvious to those skilled in the art.

Although the preceding description uses the terms "cathode" and "anode" to identify the electrodes of the thermoelectric generator of the present invention, it will be obvious to those skilled in the art that the cathode actually functions as an electron emitter and that the anodes function as electron collectors. Consequently, in order to define the nature and scope of the invention more precisely, the cathode and anode electrodes are referred to in the appended claims by the terms "emitter" and "collector," respectively.

I claim:

1. Thermionic electric generator comprising a heating source, an emitter exposed to said heating source, a plurality of collectors arranged in a surface facing said emitter, electrical connections connecting said collectors together in sets with the collectors of each set interspersed with those of another set, means enclosing the space between said emitter and said collectors, an easily ionizable gas or vapour filling the enclosed space, means for setting up a magnetic field extending in a direction transverse to the emitter/collector path, an oscillating electric circuit, and electrical connections from said emitter and from each of said sets of collectors to chosen out-of-phase points of said circuit, whereby electrical energy may be derived from the thermal energy supplied by said heating source.

2. Thermionic electric generator comprising a heating source, an emitter exposed on one surface to said heating source, a plurality of collectors arranged in a surface facing the surface of said emitter remote from said heating source, electrical connections connecting said collectors together in a plurality of sets with the collectors of each set interspersed with those of another set, means enclosing the space between said emitter and said collectors, a low pressure heavy alkali metal vapour filling said enclosed space, means for setting up a magnetic field extending in a direction transverse to the emitter/collector path, an oscillator circuit, and electrical connections from said emitter and from each of said sets of collectors to chosen points in said oscillator circuit which in operation are at different instantaneous potentials, whereby electrical energy may be derived from the thermal energy supplied by said heating source.

3. Thermionic electric generator comprising a tubular emitter structure, means for heating said emitter structure from within, a collector structure surrounding said emitter structure and comprising a plurality of collectors divided into at least two sets, the collectors of each set being connected together and with the collectors of one of said sets alternating between the collectors of the other of said sets, means forming an envelope enclosing at least the space between said emitter structure and said collector structure, said envelope being filled at low pressure with an ionizable gas or vapour, means for cooling said collectors, means for maintaining a magnetic field extending in directions parallel to the axis of said emitter structure in the space between said emitter and said collectors, an oscillator circuit, and electrical connections from said emitter and from both of said sets of collectors to selected points of said oscillator circuit, whereby electrical energy may be derived from the thermal energy from said heating means.

4. Generator as claimed in claim 3 wherein said collector structure comprises two sets of collectors of strip form with the collectors of one set lying between the collectors of the other set to form a substantially complete cylindrical surface surrounding said emitter structure, and wherein said envelope comprises insulating means closing the spaces between said collector strips to complete the enclosure of said emitter, and insulating means closing the annular spaces between the ends of said emitter and said collector structure to seal the space between said emitter and said collector structure.

5. Generator as claimed in claim 4 including an outer case surrounding said collector structure, and means for passing a coolant through the space between said outer casing and said collector structure to cool said collectors.

6. Thermionic generating apparatus comprising a generator as claimed in claim 4 wherein said oscillator circuit includes a transformer having a primary winding and a secondary winding, and wherein said electrical connections include a connection betwen the collectors of one of said sets of collectors and one end of said primary winding, a connection between the other of said sets of collectors and the other end of said primary winding, and at least one connection between said emitter and a point on said primary winding intermediate its ends.

7. Generating apparatus as claimed in claim 6 wherein the secondary winding of said transformer is connected in a tuned circuit.

8. Thermionic electric generator for converting thermal energy into electrical energy comprising a source of thermal energy, an emitter heated by thermal energy derived from said source, a plurality of collectors arranged in a surface facing said emitter, electrical connections connecting said collectors together in sets with the collectors of each set interspersed with the collectors of another set, means forming a gas-tight enclosure for the space between said emitter and said collectors, said space having a low pressure filling of the vapour of at least one metal having an ionization potential between 4.4 and 3.8 volts, means for setting up a magnetic field extending in a direction transverse to the emitter/collector path, an oscillator circuit, and electrical connections from said emitter and from each set of said collectors to chosen out-of-phase points of said oscillator circuit for delivering the electrical energy produced thereby from the thermal energy derived from said source.

9. Thermionic electric generator for converting thermal energy into electrical energy comprising a source of thermal energy, an emitter heated by thermal energy derived from said source, two sets of collectors arranged in a surface facing said emitter with the collectors of one of said sets alternating between the collectors of the other of said sets, means cooperating with said emitter and said collectors for forming a gas-tight enclosure for the space between said emitter and said collectors, said space being filled with an easily ionizable gas or vapour having a vapour pressure such as to produce a negative collector drop, means for setting up a magnetic field transverse to the emitter/collector path, an oscillator circuit, and electrical connections from said emitter and from each set of said collectors to chosen points in said oscillator circuit which in operation are at different instantaneous potentials, whereby electrical energy may be derived from the thermal energy derived from said source.

10. Generator as claimed in claim 8 wherein said space has a low pressure filling of the vapour of at least one heavy alkali metal selected from the group consisting of potassium, rubidium, caseium and francium.

11. Generator as claimed in claim 8 wherein said space has a low pressure filling of caesium vapour.

12. Generator as claimed in claim 9 wherein the vapour pressure within said space is such as to produce about $(m/M)^{1/2}$ ions per electron, where $m$ is the electron mass and M is the ion mass.

References Cited in the file of this patent

UNITED STATES PATENTS

| | | |
|---|---|---|
| 1,565,416 | Chubb | Dec. 15, 1925 |
| 2,428,612 | Blewett | Oct. 7, 1947 |
| 2,534,521 | King | Dec. 19, 1950 |
| 2,748,280 | Nelson et al. | May 29, 1956 |
| 2,915,652 | Hatsopoulos | Dec. 1, 1959 |
| 3,041,481 | Peters | June 26, 1962 |